May 30, 1950          J. MORE          2,509,834
LIQUID DEPTH INDICATOR
Filed Jan. 30, 1948          3 Sheets—Sheet 1
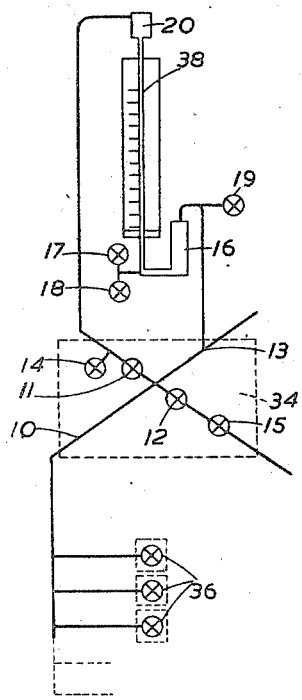
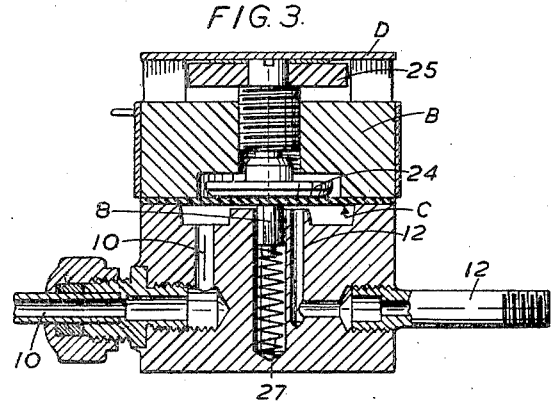
Inventor
JASPER MORE
By Young, Emery & Thompson
Attorneys May 30, 1950 — J. MORE — 2,509,834
LIQUID DEPTH INDICATOR
Filed Jan. 30, 1948 — 3 Sheets-Sheet 3
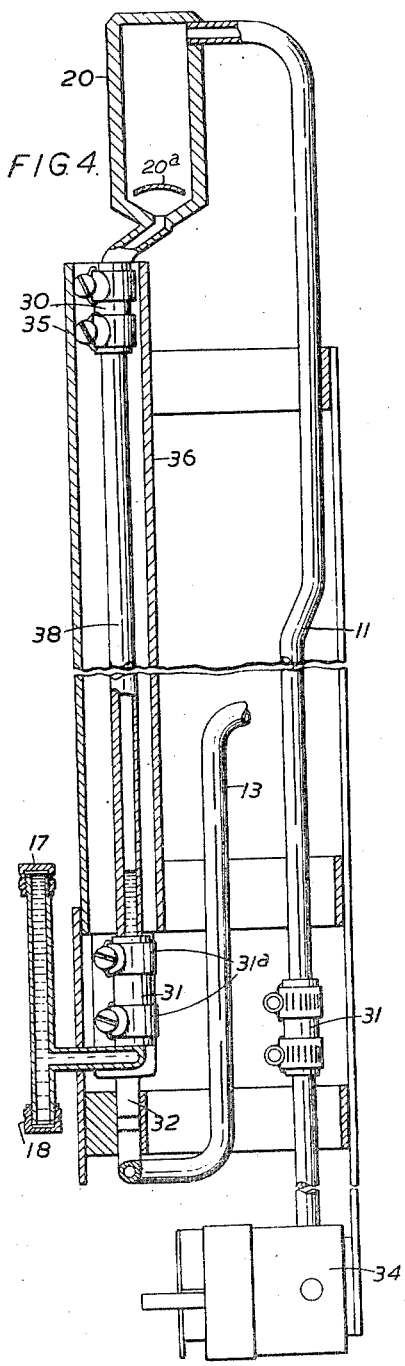
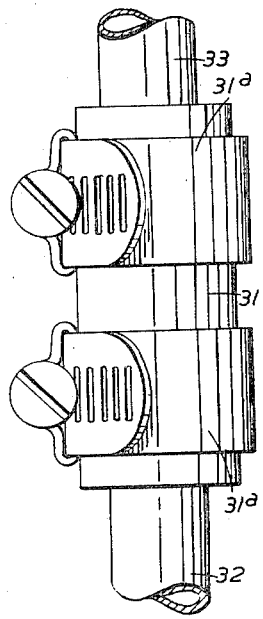
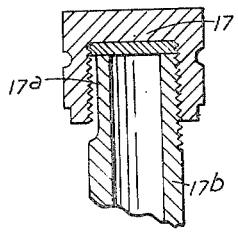
Inventor
JASPER MORE
By Young, Emery & Thompson
Attorneys Patented May 30, 1950

2,509,834

UNITED STATES PATENT OFFICE 2,509,834

LIQUID DEPTH INDICATOR

Jasper More, New Monkland, by Airdrie, Scotland, assignor to Dobbie McInnes Limited, Glasgow, Scotland Application January 30, 1948, Serial No. 5,254
In Great Britain October 3, 1946

Section 1, Public Law 690, August 8, 1946
Patent expires October 3, 1966

10 Claims. (Cl. 73—302)

1

This invention relates to liquid depth or ship's draught or displacement indicators or gauges (hereinafter and in the claims referred to simply as gauges) of the manometer type which by movement of liquid contained in the two or more legs, may indicate (if desired remotely), through the medium of air or gas, the depth or head of liquid in a tank or of water outwith a ship's hull above a given datum level, and in which scales alongside one leg of the gauge are calibrated in units of depth, weight, volume, ship's draught, or displacement. The invention further relates to control cocks for use in such gauges.

In such gauges it has been proposed to provide multiple way cocks so as to connect the limbs of the manometer to the tank or to a pressure air supply for cleaning out the pipelines, and to make the successive connections as required during normal use of the gauge. It has been proposed to make such cocks of the usual plug and body construction in which the plug rotates relative to the body to interconnect the various passages and ports. Such cocks as previously proposed have thus had several openings in the plug or body or both, with a resulting complex design. The body is generally of cylindrical or conical shape and is difficult to construct accurately and is usually made from a casting which is difficult to machine and finish.

Leakage of air between the mating surfaces of such a cock may occur if grooves should be cut in them by foreign matter lodging on the surfaces, or if the surfaces wear and deviate from their true conical or cylindrical form. Also if the surfaces are not lubricated at intervals they may bind together and cause seizure. In some cocks, especially when connected to a tank under air pressure, the design permits of the plug lifting from the body under the air pressure, thus causing air leakage to the atmosphere.

One of the objects of the invention is to provide a cock for the purpose described which is capable of being constructed accurately and which in use, will minimise the possibility of leakage or seizure.

A further object of the invention is to provide a cock capable of readily being made mainly from stock parts, and by simple and few manufacturing processes.

A further object is to provide a cock for the purposes described which involves the minimum number of controls necessary for obtaining the various connections required in practice.

Some embodiments of the invention will now be described simply by way of example with reference to the accompanying drawings wherein:

Fig. 1 is a diagram illustrating the connections between the manometer and the various cocks and the various tanks.

Fig. 3 is a vertical mid-sectional view of the assembled cock.

Fig. 4 is a vertical sectional view through the gauge showing details thereof.

Fig. 5 is a detail elevation showing the method of mounting the sight tube.

Fig. 6 is a detail sectional view illustrating the filler for filling the mercury or other liquid into the manometer.

Figure 2:
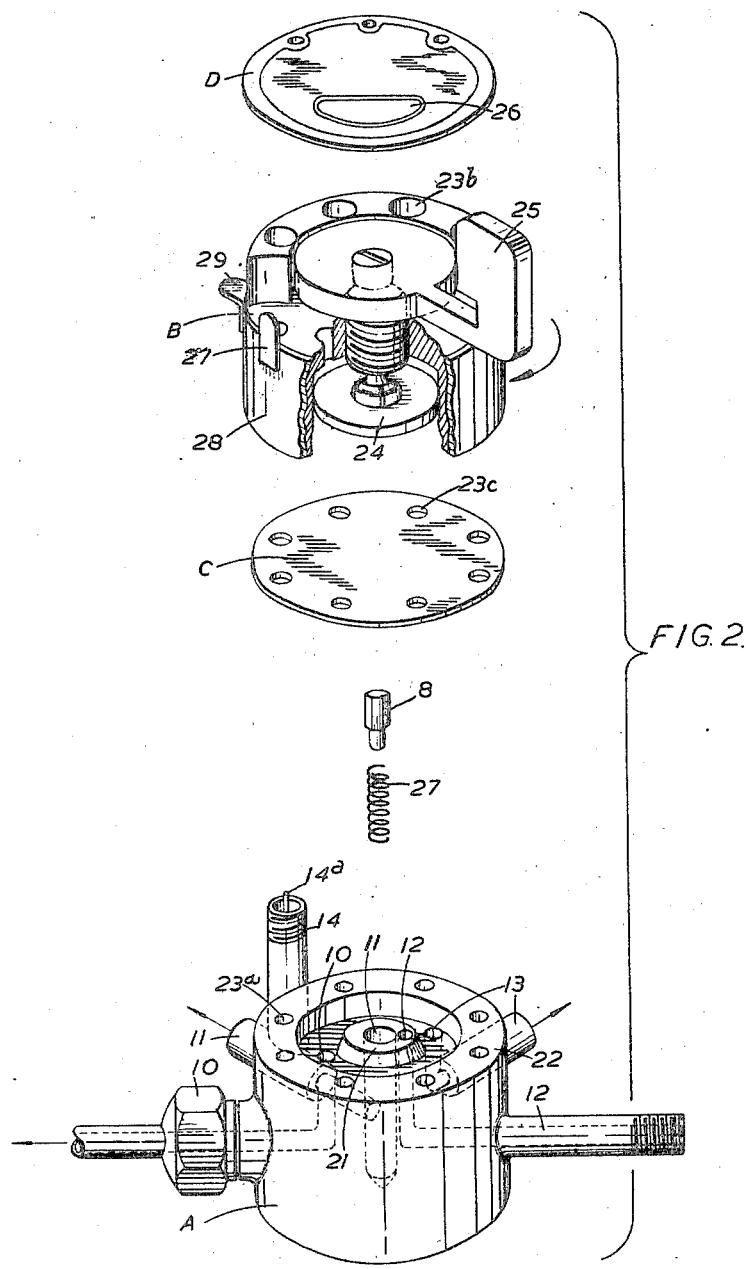
Fig. 2 is an "exploded" view of a multiple-way cock showing the component parts thereof in spaced position for clearness.

The manometer comprises one limb forming a sight tube 38, the other limb being formed as a reservoir 16, a filling plug being indicated at 17, and a drain plug at 18, while a vent plug for use in filling is indicated at 19. The sight tube leads through the overflow cup 20 through a pipe line having a diaphragm valve 11, and also spring-controlled pin-operated release valve 14, branching therefrom. There is then a four-way junction, one branch from which leads through a pipe line 13 back to the reservoir, another which leads through a passage with a diaphragm valve 12 and a non-return valve 15 to an air pump, while the fourth branch 10 leads to the tanks 36 or other source of pressure which have to be gauged.

As shown in Fig. 2, the valves 11, 12, 14 and the associated pipe lines and ports are constructed as a single unit whereby the simple manual operation of a single control allows the required connections to be obtained.

The control cock is made up of a lower body part A, an upper body part B, an intermediate flexible diaphragm C, and a cover plate D.

The lower body part is shown with passages 10 and 13 leading to a common annular groove in the upper part thereof whereby these two passages are interconnected to form a through passage. A branch from the through passage is indicated at 11, being directed radially inwards and merging into a central vertical passage closed at the bottom, but opening at the top, at its junction with the through passage, on a flat seat 21, while a similar branch 12 extends radially inwards and upwards parallel to the said central passage, and also opens on the said seat 21, the surface of this seat being slightly below the level of the upper surface 22 of the body A. The references 11 and 12 are utilised also for these branches, or passages, the valves 11 and 12 being formed by these branches in conjunction with the diaphragm C.

In the branch 11 but just outside of and adjacent to the body A is located the one-way valve 14 which is similar to that used for inflating automobile tires and is provided with a central pin 14a, which when depressed allows air to release therethrough. A similar valve 15 (Fig. 1) is provided externally in the branch 12 acting as a one-way valve to allow pressure air from a pump to enter the control cock through valve 12 but not to pass back to the air pump.

The diaphragm C is resilient and flexible, preferably being made of synthetic rubber and having a reinforcement say of fabric.

The upper body B sits on top of the diaphragm C, and the three parts A, B and C are provided with eight vertical holes 23a, 23b and 23c spaced around the periphery thereof and which extend parallel to the vertical centre line of the cock and by means of bolts passing through said holes the three parts may be assembled rigidly together thereby clamping the periphery of the diaphragm C.

The upper body B carries centrally therein, a swivel-pad 24 whose spindle is threaded in the body B, and at its upper end is connected with a handle 25. Thus rotation of the handle in one direction causes the swivel-pad 24 to press the diaphragm C down on to seat 21 thereby isolating branches 11 and 12 from each other and from the branches 10 and 13. The rotation of the handle in the opposite direction connects 11 and 12 together and to branches 10 and 13. The diaphragm is normally urged away from seat 21 by the spring 27 urging a plunger 8 upwards in branch 11, the plunger 8 being of enlarged hexagonal shape at the upper part thereby allowing passage of air past same within branch 11.

The cover plate D is fitted on top of body B and is used as an indicator to show the position resulting from movement of handle 25, coloured markings or the like being viewable from a window 26.

The upper and lower body parts B and A may conveniently be made from rod metal, drilled and machined as required, the lower part being drilled radially and axially to provide the branches 10, 11, 12 and 13.

When the handle 25 is moved to the extreme closed position i. e., at the maximum downward travel of the swivel-pad 24, the handle 25 engages an upwardly inclined surface on top of a lug 27, said lug 27 being attached to a resilient metal collar 28 which is anchored on body B at a position at the opposite side thereof and which is split vertically thereby allowing the lug 27 and the adjacent part of the collar to be depressed by the handle. As a result a projection 29 on said collar engages pin 14a of valve 14 in order to open said valve and thus the branch 11 to air release.

In operation there are generally three steps involved in taking a measurement for example of the depth of liquid in a tank containing liquid, the measurement usually being effected by locating a bell in the bottom of the tank and from which the liquid can be expelled by air pressure from the gauge pump. These operations are:

1. Clearing the line to the bell in the tank of any obstruction and checking the zero reading of the manometer. These can be done simultaneously by opening valves 11 and 12, valve 14 of course remaining closed. This is done with the swivel-pad 24 at its top position. The pressure from the pump is balanced as regards the limbs of the manometer, but it drives out any obstruction in the line to the bell.

2. Air is pumped into the system by the non-return valve 15 again balancing across the limbs of the manometer and until the bell in the tank is entirely clear of the liquid.

3. Reading is effected by closing valves 11 and 12 and opening the valve 14. The pressure in the bell necessary to balance the head of liquid in the tank is then communicated to the manometer where the difference in the mercury in the limbs can be read off. This last operation is done by moving the handle 25 to the opposite position to that shown in Fig. 2. This not only causes the diaphragm to close ports 11 and 12 but to open valve 14 through its pin 14a. The opening of the valve 14 obviously puts the top of the limb in the sight tube in communication with the atmosphere.

If there are a plurality of tanks to be gauged, then prior to operation 2 the appropriate tank is selected by opening the appropriate tank cock. A tank cock may conveniently comprise a body similar to the lower body A (Fig. 2) but having only two branches leading thereto, one branch like 13 leading to the annular groove and the other like 11 leading to the top of seat 21. In this way opening and closing is effected by raising and lowering of the diaphragm in the manner described above, and thus relatively rotating parts are avoided.

Whether applied to a complex control cock as shown in Fig. 2 or to a simple off-on cock as referred to, the construction utilising a diaphragm as described above facilities manufacture and eliminates wear on working surfaces and thus minimises leakage.

As indicated in Fig. 4, the sight tube 38 of the manometer is supported between two resilient or flexible end supports 30, 31, each comprising a rubber or other resilient sleeve clamped by a screw-contractable annular clip 31a between rigid corresponding supports 32, 33.

These connections form pressure tight joints which are easily and rapidly fitted. The flexible tubes 31 are insufficiently flexible to cause such increase in volume under normal internal working pressure as would produce error in the reading, but they allow for differential longitudinal expansion between the glass or plastic transparent sight tube 38 and the metal frame of the manometer, without producing undue stress in any part.

A similar connection 31 is indicated in the branch 11 leading to the control cock indicated generally at 34 in Figs. 1 and 4.

The sight tube is housed in a housing having a transparent front 35 of plastic material and an opaque back 36 also of plastic material and having scale markings.

Filling and drainage plugs are indicated as aforesaid at 17 and 18. The filling plug comprises a removable screw cap 17 adapted to close the top of the filling tube 17b (Fig. 6) a flat 17a being formed at the top of 17b so that as cap 17 is tightened down air is allowed to escape by 17a and back pumping of the mercury in the tube is avoided. At the top of sight tube 38 is the overflow chamber 20 provided with a shield 20a to prevent squirting, the branch 11 leaving the overflow chamber at the top thereof.

As a result of the invention there is provided a gauge of the type aforesaid, of simple design, and which can be readily made mainly from stock parts or materials of a simple and easily obtainable nature and/or by simple and few manufacturing processes.

In all embodiments of the invention no castings need be employed, and many of the metal to metal joints are simply welded or brazed.

Risk of leakage, wear, or seizure of the valves of the manometer is minimised if not eliminated.

It will be understood that the invention may equally well be applied to manometers of the bi-liquid or differential type, two liquids such as mercury and oil being employed in a reservoir assembly which may be parallel to the indicating leg or preferably concentric with it.

When a manometer is used as a tank gauge and the upper part of the tank is subject to internal gases or vapour pressure different from atmospheric pressure, a balance line is provided so that the valve 14 releases to the upper part of the tank instead of to atmosphere. For clearing the balance line of obstructions, a valve similar in type to 14 is incorporated in the balance line so that the pump pressure may be applied to the balance line.

I claim:

1. A control cock for connecting a tank or the like to a gauge of the type aforesaid in order to measure depth, draught or displacement, comprising a body, a through passage in the body adapted to interconnect the manometer reservoir and the liquid the level of which is to be measured, a branch passage in the body joining said through passage and adapted for connection to the sight tube of the manometer, said through and branch passages being communicable with a common source of air pressure, a valve seat at the junction of the through and branch passages, and a flexible diaphragm movable towards and away from the seat in order to isolate the branch passage from the through passage and from the source of air pressure.

2. A control cock for a gauge of the type aforesaid, comprising a body, first and second passages in the body interconnected to form a through passage and adapted to be connected respectively to the manometer reservoir and the liquid the level of which is to be measured, third and fourth passages in the body branching from said through passage and adapted to be connected respectively to the sight tube of the manometer and a source of air pressure, a valve seat at the junction of said third passage and said through passage, and a flexible diaphragm disposed adjacent said seat and adapted to move under manual control towards or away from said seat in order to isolate said third passage from the other passages or to connect said third passage with the other passages.

3. A control cock for a gauge of the type aforesaid, comprising a body, first and second passages in the body interconnected to form a through passage and adapted to be connected respectively to the manometer reservoir and the liquid the level of which is to be measured, third and fourth passages in the body branching from a common surface in said through passage and adapted to be connected respectively to the sight tube of the manometer and a source of air pressure, a valve seat formed by said common surface, and a flexible diaphragm disposed adjacent said seat and adapted to move under manual control towards or away from said seat in order to isolate said third and fourth passages from each other and from said through passage or to connect said third and fourth passages with each other and with said through passage.

4. A control cock for connecting a tank or the like to a gauge of the type aforesaid in order to measure depth, draught or displacement, comprising a body, a through passage in the body adapted to interconnect the manometer reservoir and the liquid the level of which is to be measured, a branch passage in the body joining said through passage and adapted for connection to the sight tube of the manometer, said through and branch passages being communicable with a common source of air pressure, an outlet from said branch passage to atmosphere, valve means closing said outlet and operable to release the sight tube of the manometer to atmosphere, a valve seat at the junction of the through and branch passages, and a flexible diaphragm movable towards and away from the seat in order to isolate the branch passage from the through passage and from the source of air pressure.

5. A control cock for a gauge of the type aforesaid, comprising a body, first and second passages in the body interconnected to form a through passage and adapted to be connected respectively to the manometer reservoir and the liquid the level of which is to be measured, third and fourth passages in the body branching from a common surface in said through passage and adapted to be connected respectively to the sight tube of the manometer and a source of air pressure, an outlet from said third passage to atmosphere, valve means closing said outlet and operable to release the sight tube of the manometer to atmosphere, a valve seat formed by said common surface, and a flexible diaphragm disposed adjacent said seat and adapted to move under manual control towards or away from said seat in order to isolate said third and fourth passages from each other and from said through passage or to connect said third and fourth passages with each other and with said through passage.

6. A control cock for connecting a tank or the like to a gauge of the type aforesaid in order to measure depth, draught or displacement, comprising a body, a through passage in the body adapted to interconnect the manometer reservoir and the liquid the level of which is to be measured, a branch passage in the body joining said through passage and adapted for connection to the sight tube of the manometer, said through and branch passages being communicable with a common source of air pressure, an outlet from said branch passage to atmosphere, valve means closing said outlet and operable to release the sight tube of the manometer to atmosphere, a valve seat, at the junction of the through and branch passages, a flexible diaphragm movable towards and away from said seat in order to isolate the branch passage from the through passage and from the source of air pressure, control means for flexing said diaphragm, and an operative connection between said control means and said valve means whereby operation of said control means to move said diaphragm against said seat effects operation of said valve means to release the sight tube of the manometer to atmosphere.

7. A control cock for connecting a tank or the like to a gauge of the type aforesaid in order to measure depth, draught or displacement, comprising a body, a through passage in the body adapted to interconnect the manometer reservoir and the liquid the level of which is to be measured, a branch passage in the body joining said through passage and adapted for connection to the sight tube of the manometer, said through and branch passages being communicable with a common source of air pressure, an outlet from said branch passage to atmosphere, valve means closing said outlet and operable to release the sight tube of the manometer to atmosphere, a valve seat at the junction of the through and branch passages, a flexible diaphragm movable towards and away from said seat in order to isolate the branch passage from the through passage and from the source of air pressure, control means for flexing said diaphragm, a resilient collar surrounding the body and anchored thereto, said collar being split so as to have a part resiliently movable relatively to the body, a lug on the collar part engageable by said control means, and a projection on the collar part engageable with the valve means, so that operation of the control means to move the diaphragm against the seat operates the valve means to release the sight tube of the manometer to atmosphere.

8. A control cock for connecting a tank or the like to a gauge of the type aforesaid in order to measure depth, draught or displacement, comprising two body parts, spaced bolts extending through the parts to hold the parts securely together, a through passage in one of the body parts adapted to interconnect the manometer reservoir and the liquid the level of which is to be measured, a branch passage in the same body part as said through passage and joining said through passage, said branch passage being adapted for connection to the sight tube of the manometer and said through and branch passages being communicable with a common source of air pressure, a valve seat at the junction of said through and branch passages, and a flexible diaphragm clamped between said body parts by said bolts and movable towards and away from the seat in order to isolate the branch passage from the through passage and from the source of air pressure.

9. A control cock as claimed in claim 20, wherein the through passage consists of two bores each extending first inwards from the side of the same body part and then at right angles towards the end of said body part and an annular groove in the end of said body part interconnecting the ends of said bores, and the branch passage consists of a bore extending inwards from the side of said body part and then at right angles towards the end of said part and opening into said annular groove.

10. In combination, a gauge of the manometer type including a liquid reservoir and sight tube, and a control cock for connecting a tank or the like to the gauge and comprising a body, first and second passages in the body interconnected to form a through passage connected at one end to the manometer reservoir and connectible at the other end to the liquid the level of which is to be measured, third and fourth passages in the body branching from said through passage, the third passage being connected to the sight tube of the manometer and the fourth passage being connectible to a source of air pressure, a valve seat at the junction of said third passage and said through passage, and a flexible diaphragm disposed adjacent said seat and adapted to move under manual control towards or away from said seat in order to isolate said third passage from the other passages or to connect said third passage with the other passages.

JASPER MORE.

REFERENCES CITED

The following references are of record in the file of this patent:

UNITED STATES PATENTS

| Number | Name | Date |
|---|---|---|
| 190,464 | Beyschlag | May 8, 1877 |
| 954,172 | Dalen | Apr. 5, 1910 |
| 955,675 | Morlan | Apr. 19, 1910 |
| 1,118,649 | Halter | Nov. 24, 1914 |
| 2,427,690 | Peterson | Sept. 23, 1947 |

FOREIGN PATENTS

| Number | Country | Date |
|---|---|---|
| 35,697 | Austria | Dec. 23, 1908 |